United States Patent
Scelers

(10) Patent No.: US 7,509,202 B2
(45) Date of Patent: Mar. 24, 2009

(54) NEUTRAL IDLE HILL DETECTION

(75) Inventor: Herve Scelers, Illkirch-Graffenstaden (FR)

(73) Assignee: General Motors Corporation, Detroit, MI (US)

( * ) Notice: Subject to any disclaimer, the term of this patent is extended or adjusted under 35 U.S.C. 154(b) by 466 days.

(21) Appl. No.: 11/333,132

(22) Filed: Jan. 17, 2006

(65) Prior Publication Data

US 2007/0168103 A1 Jul. 19, 2007

(51) Int. Cl.
G06F 19/00 (2006.01)
F16H 61/00 (2006.01)

(52) U.S. Cl. .............................. 701/65; 701/67; 477/70; 477/76

(58) Field of Classification Search ........................ None
See application file for complete search history.

(56) References Cited

U.S. PATENT DOCUMENTS

| | | | | |
|---|---|---|---|---|
| 4,648,289 A | * | 3/1987 | Kubo et al. | 477/93 |
| 5,911,646 A | * | 6/1999 | Tsutsui et al. | 477/93 |
| 6,253,140 B1 | * | 6/2001 | Jain et al. | 701/67 |
| 6,411,881 B1 | * | 6/2002 | Thomas | 701/67 |
| 6,542,804 B2 | * | 4/2003 | Muratomi | 701/62 |
| 2002/0065170 A1 | * | 5/2002 | Suzuki | 477/171 |

* cited by examiner

Primary Examiner—Michael J. Zanelli

(57) ABSTRACT

A neutral idle hill detection system for a vehicle with an automatic transmission comprises a range selection input device that receives an operating range of a transmission. A throttle position input device receives a throttle position signal. A transmission output speed input device receives a transmission output speed signal. A transmission temperature input device receives a temperature signal. A brake status input device receives a brake signal. A control module receives the range, the throttle position signal, the transmission output speed signal, the temperature signal, and the brake signal, detects a hill condition based on the received signals, and controls a first clutch of the transmission based on the hill condition.

27 Claims, 8 Drawing Sheets

| Range | C1 | C2 | C3 | C4 | C5 |
|-------|----|----|----|----|----|
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

Clutches Engaged

*Figure 2*

| Operator | Operand | Operator |
|---|---|---|
| Transmission Range | equals | a forward gear |
| Output speed | is less than | a selectable value |
| Turbine speed | is less than | a selectable value |
| Throttle position | is less than | a selectable value |
| Brake Status | equals | TRUE (brake is applied) |
| Transmission temperature | is between | a selectable range |
| Brake pressure (if available) | is greater than | a selectable minimum |
| AND | | |
| Hill Counter | is less than | a selectable maximum |
| OR | | |
| Hill Counter  And  Brake Pressure  (If brake pressure available) | is greater than  is greater than | the selectable maximum  hill brake pressure + a selectable offset |
| OR | | |
| Hill Counter  And  Hill detection flag  (If brake pressure not available) | is greater than  equals | the selectable maximum  TRUE |

*Figure 5*

| Operand | Operator | Operand |
|---|---|---|
| Transmission Range | not equal to | a forward range |
| Output speed | is greater than | the selectable value |
| Throttle position | is greater than | the selectable value |
| Brake Status | equals | FALSE |
| Transmission temperature | is outside of | the selectable range |
| Brake pressure<br><br>And<br><br>Brake Pressure Derivative<br><br>(if brake pressure available) | is less than<br><br><br><br>is less than | the selectable minimum<br><br><br><br>a selectable value |
| Hill Counter<br><br>And<br><br>Brake Pressure<br><br>(If brake pressure available) | is greater than<br><br><br><br>is greater than | the selectable maximum<br><br><br><br>hill brake pressure + a selectable offset |
| OR | | |
| Hill Counter<br><br>And<br><br>Hill detection flag<br><br>(If brake pressure not available) | is greater than<br><br><br><br>equals | the selectable maximum<br><br><br><br>FALSE |

*Figure 6*

| Operand | Operator | Operand |
|---|---|---|
| Transmission Range | equals | a forward range |
| Output speed | is greater than | the selectable value |
| Throttle position | is less than | the selectable value |
| Brake Status | equals | TRUE (brake is applied) |
| Transmission temperature | is between | the selectable range |
| Brake pressure (if available) | is greater than | the selectable minimum |
| Neutral Idle Control Flag | equals | FALSE |
| AND | | |
| Hill Counter | less than | the selectable maximum |
| OR | | |
| Hill Counter<br><br>AND<br><br>Brake Pressure<br><br>(If brake pressure available) | is greater than<br><br><br><br>is greater than | the selectable maximum<br><br><br><br>hill brake pressure + the selectable offset |
| OR | | |
| Hill Counter<br><br>AND<br><br>Hill Detection Flag<br><br>(If brake pressure not available) | is greater than<br><br><br><br>equals | the selectable maximum<br><br><br><br>TRUE |

*Figure 7*

| Operand | Operator | Operand |
|---|---|---|
| Output speed | is greater than | the selectable value |
| Throttle position | is greater than | the selectable value |
| Brake Status | equals | FALSE |
| OR | | |
| Brake pressure (if brake pressure available) | is less than | the selectable minimum |

*Figure 8*

NEUTRAL IDLE HILL DETECTION

FIELD OF THE INVENTION

The present invention relates to transmission control systems and methods, and more particularly to transmission control systems and methods that control an operational state of a clutch.

BACKGROUND OF THE INVENTION

During vehicle travel there are many instances where the vehicle must stop and idle while still remaining in gear. For example, vehicles stop and idle at traffic signals, cross-walks, stop signs, and the like. During idle conditions when the transmission is in gear, transmission neutral idle control can be used to improve fuel economy by reducing the load on the engine. When the vehicle is at rest, the brakes are applied, the transmission is in a drive manual range, and the engine is idling, a transmission drive input clutch can be released to produce a geared neutral state. By going to this geared neutral state, the amount of fuel required to keep the engine idle stable will be reduced when compared to normal in-gear idle conditions. This is intended to improve fuel economy during conditions that would be encountered during urban driving when the vehicle frequently stops for traffic lights, or during congested stop-and-go driving.

Vehicles implementing the neutral idle control may experience vehicle roll-back events during periods of idle while positioned on a hill. More specifically, if a vehicle is idling on a surface that has a sufficient grade, the vehicle may be induced to roll backward once the transmission input clutch is released. This occurs when the brake pressure is not sufficient to maintain the position of the vehicle.

SUMMARY OF THE INVENTION

Accordingly, a neutral idle hill detection system for a vehicle with an automatic transmission comprises a range selection input device that receives an operating range of a transmission. A throttle position input device receives a throttle position signal. A transmission output speed input device receives a transmission output speed signal. A transmission temperature input device receives a temperature signal. A brake status input device receives a brake signal. A control module receives the range, the throttle position signal, the transmission output speed signal, the temperature signal, and the brake signal, detects a hill condition based on the received signals, and controls a first clutch of the transmission based on the hill condition.

In one other feature, the neutral idle hill detection system comprises a brake module that determines brake pressure, and wherein the control module receives the brake pressure and detects the hill condition based on the brake pressure.

In another feature, the control module increments a hill counter if the hill condition is detected and determines a neutral idle condition based on the hill counter. The first clutch is controlled based on the neutral idle condition.

In other features, the neutral idle hill detection system comprises a turbine speed input device that receives a turbine speed signal. The control module receives the turbine speed signal and further determines the neutral idle condition based on the transmission range, the transmission output speed signal, the throttle position signal, the turbine speed signal, the brake signal, and the transmission temperature signal. Alternatively, the neutral idle condition is further determined based on the transmission range, the transmission output speed signal, the turbine speed signal, the throttle position signal, the brake signal, the transmission temperature signal, and a brake pressure or the hill condition.

In still other features, the control module detects the hill condition if: range indicates the transmission is operating in a forward range, the transmission output speed signal is greater than a selectable value, the throttle position signal is less than a selectable value, the brake signal indicates the brakes are applied, and the temperature signal falls within a selectable range.

In still other features, the control module increments a hill counter and sets a hill condition flag to true if control detects the hill condition. The control module detects the hill condition if the counter is less than a selectable maximum. Alternatively, the control module detects the hill condition if the hill counter is greater than a selectable maximum and the brake pressure is greater than a hill brake pressure plus a selectable offset.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a chart illustrating the required clutches to be engaged in order to achieve a desired gear for a six speed clutch to clutch transmission;

FIG. 5 is a table that lists entrance conditions for the neutral idle control method;

FIG. 6 is a table that lists exit conditions for the neutral idle control method;

FIG. 7 is a table that lists entrance conditions for the hill detection method according to the present invention; and FIG. 8 is a table that lists exit conditions for the hill detection method according to the present invention.

DETAILED DESCRIPTION OF THE PREFERRED EMBODIMENTS

Figure 1:
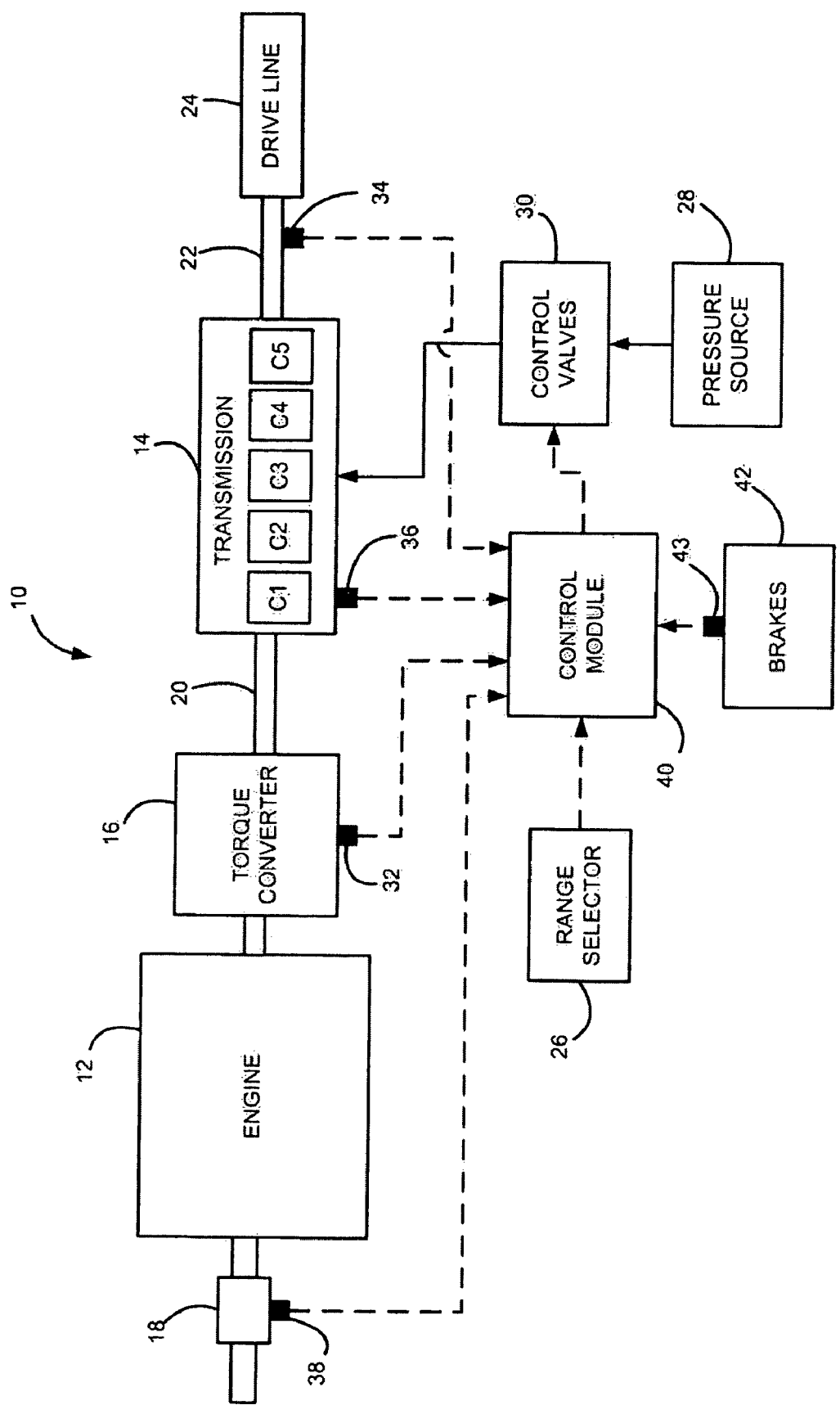
FIG. 1 is a schematic illustration of a vehicle incorporating a hill detection system for a neutral idle control system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to produce drive torque. The torque converter 16 supplies the engine torque to the transmission via an input shaft 20. The transmission 14 in the preferred embodiment is a multi-speed automatic clutch-to-clutch transmission that drives an output shaft 22 based on engine torque. As can be appreciated, the transmission can also be any type of automatic transmission including, but not limited to freewheel transmissions and continuously variable transmissions (CVTs). For exemplary purposes, the present invention will be discussed in the context of the clutch-to-clutch transmission.

The output shaft 22 drives a driveline 24 of the vehicle 10. A range selection device 26 enables an operator to set the transmission at a desired operating range including, but not limited to, park, reverse, neutral, and one or more forward drive positions. The speed and torque relationships between the engine 12 and the driveline 24 are controlled by hydraulically operated clutches C1, C2, C3, C4, and C5 of the transmission 14. Pressurized fluid is provided to the clutches from a regulated hydraulic pressure source 28. The clutches C1, C2, C3, C4, and C5 are coupled to the hydraulic pressure source via control valves 30, which regulate clutch pressure by supplying or discharging fluid to/from the clutches C1, C2, C3, C4, and C5. Brakes 42 act to apply pressure to the driveline 24 to stop the momentum of the vehicle 10 during idle conditions.

Referring now to FIG. 2, in the exemplary transmission, the five clutches C1, C2, C3, C4 and C5 are selectively engaged to provide neutral, six forward drive ratios, and one reverse drive ratio. Although the exemplary automatic transmission 14 includes six forward drive ratios and one reverse drive ratio, it is appreciated that the hill detection system according to the present invention can be implemented in automatic transmissions having more or fewer drive ratios.

The table of FIG. 2 illustrates an exemplary combination of engaged clutches to establish the various drive ratios. The first forward drive ratio is established by engaging the first clutch C1 and the fifth clutch C5. The second forward drive ratio is established by disengaging the fifth clutch C5 and substantially simultaneously engaging the fourth clutch C4. To establish the third forward drive ratio, the fourth clutch C4 is disengaged as the third clutch C3 is engaged. The fourth forward drive ratio is established by disengaging the third clutch C3 while engaging the second clutch C2. To establish the fifth forward drive ratio, the first clutch C1 is disengaged as the third clutch C3 is substantially simultaneously engaged. The sixth forward drive ratio is established by disengaging the third clutch C3 and simultaneously engaging the fourth clutch C4. The reverse drive ratio is established by engaging the third clutch C3 and the fifth clutch C5. The transmission 14 is in neutral when only the fifth clutch C5 is engaged.

Referring back to FIG. 1, a first speed sensor 32 senses a rotational speed of a turbine in the torque converter 16 and generates a turbine speed signal. A second speed sensor 34 senses a rotational speed of the output shaft 22 and generates an output speed signal. A temperature sensor 36 senses a temperature of the transmission fluid and generates a transmission temperature signal. A throttle position sensor 38 senses a position of the throttle 18 and generates a throttle position signal. A brake sensor 43 senses the status of the brakes 42 and generates a brake status signal. A control module 40 receives the above mentioned signals and determines values from the signals. Control module controls the operation of the control valves 30 during neutral idle control based on the values determined from the signals and the hill detection method of the present invention.

In an alternative embodiment, a brake module (not shown) can also be included to provide a status of the brakes 42 to the control module 40. The brake module can also determine and provide a brake pressure to the control module 40.

Figure 3:
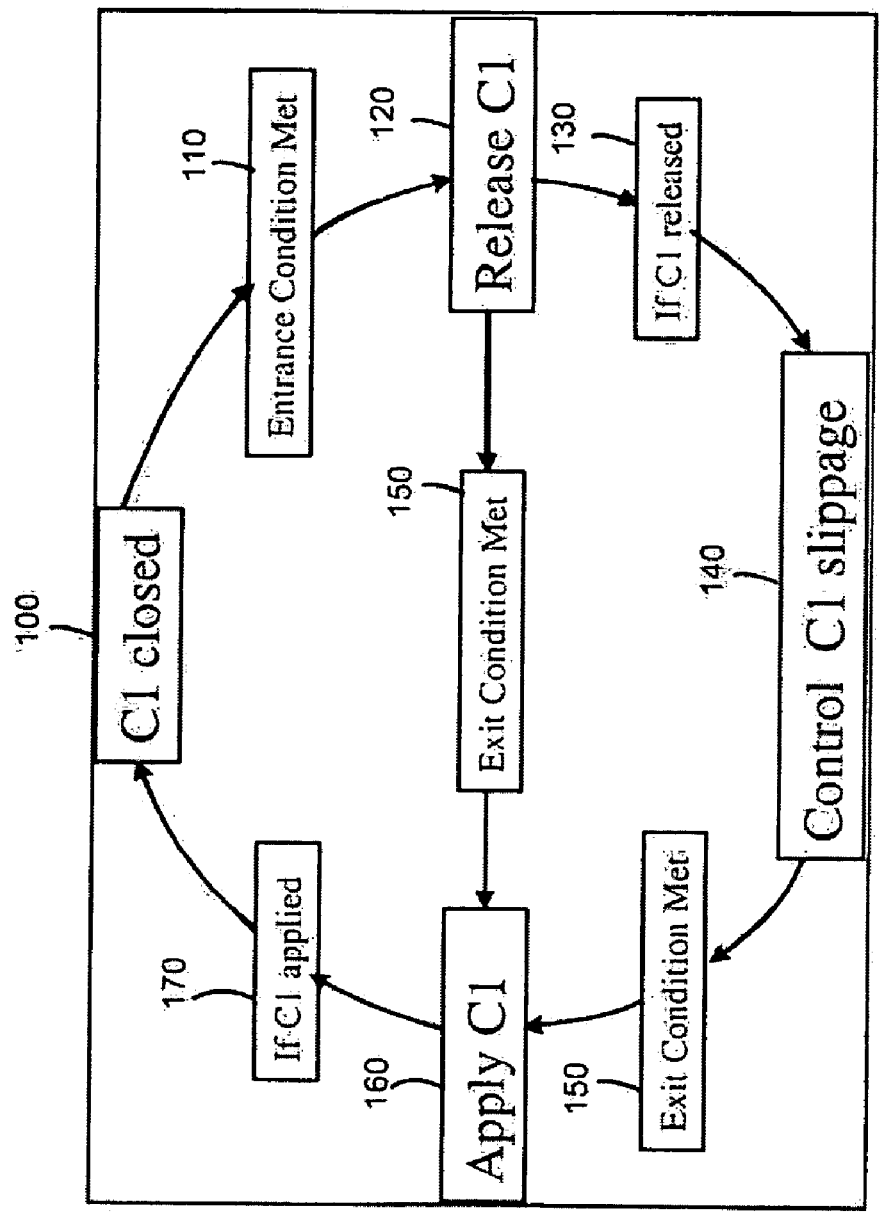
FIG. 3 is a flowchart illustrating the steps performed by the neutral idle control system.

Referring now to FIGS. 1 and 3, the flowchart illustrates the steps performed during neutral idle control. Control continually executes the neutral idle control method and the hill detection method during a drive cycle. In step 100, the clutch C1 is closed. If entrance conditions for neutral idle control are met at step 110, the clutch C1 is released in step 120. The entrance conditions include an evaluation of a hill detection flag and counter set by the hill detection method of the present invention. The flag and counter will be discussed in more detail below. The entrance conditions also include an evaluation of the transmission range, output speed, turbine speed, throttle position, the brake status, transmission temperature, and brake pressure (if available). The table of FIG. 5 lists all of the conditions that should met in order to set a neutral idle control flag to TRUE and release the clutch C1.

Referring back to FIGS. 1 and 3, once the clutch C1 is released at 130, a neutral idle control flag is set to TRUE and any slippage of the transmission is controlled in step 140. Exit conditions are also monitored. If the exit conditions are met at step 150, the clutch C1 is applied in step 160. Exit conditions include the evaluation of a hill detection flag set by the hill detection method of the present invention. This flag will be discussed in more detail below.

Exit conditions also include the evaluation of the transmission range, output speed, turbine speed, throttle position, the brake status, transmission temperature, brake pressure (if available), and a brake pressure derivative (if available). At least one of the conditions listed in the table of FIG. 6 should be met in order to set the neutral idle control flag to FALSE and re-apply the clutch C1. Referring back to FIGS. 1 and 3, if the clutch C1 is applied at step 170, the neutral idle control flag is set to FALSE and the clutch C1 remains closed in step 100.

Figure 4:
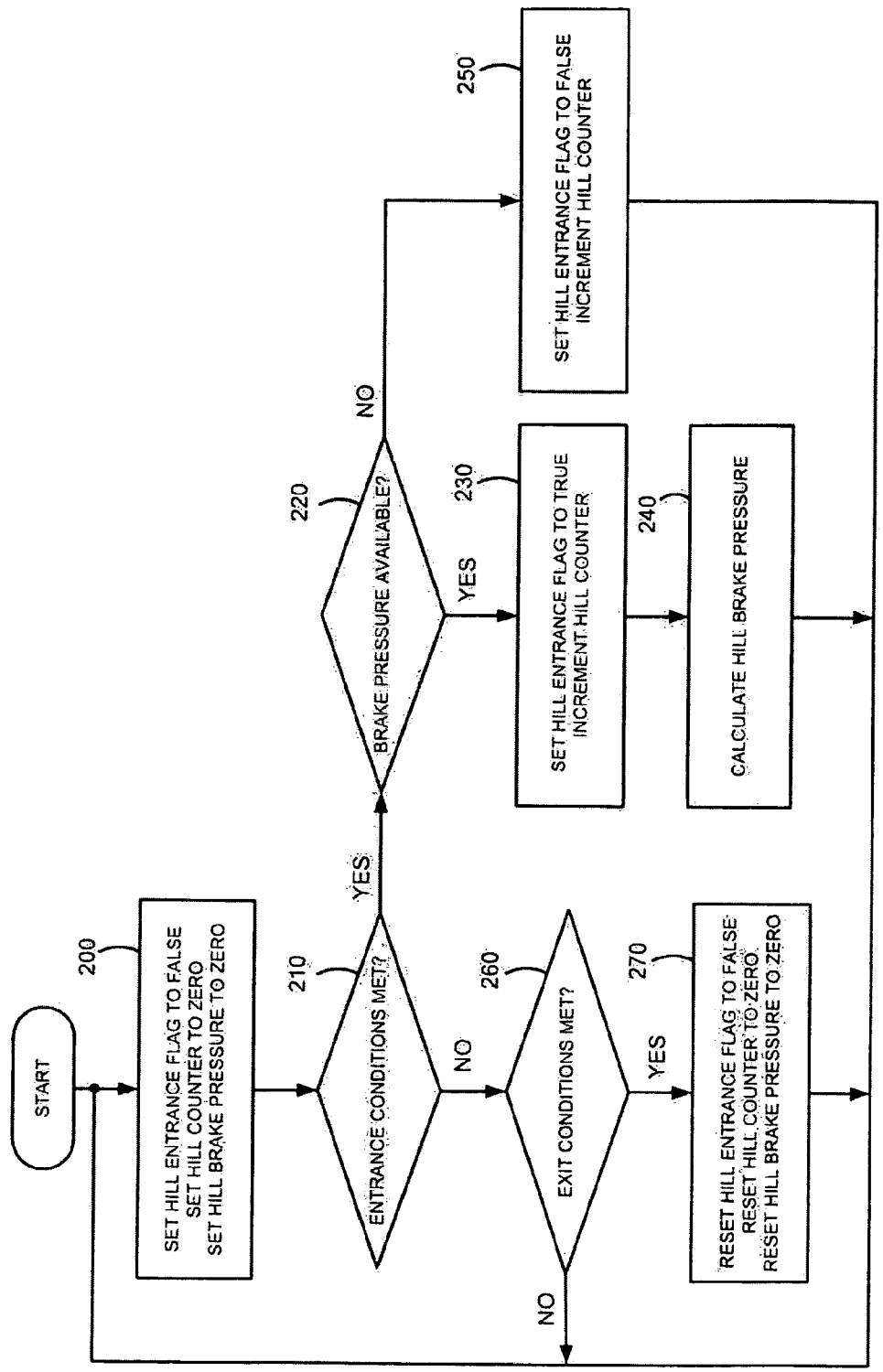
FIG. 4 is a flowchart illustrating the steps performed by the hill detection method according to the present invention.

Referring now to FIG. 4, a flowchart illustrating the steps performed by the hill detection method according to the present invention is shown. Control first initializes a hill counter and a hill brake pressure to zero and sets a hill detection flag to FALSE in step 200. In step 210, hill detection entrance conditions are evaluated. Hill detection entrance conditions include an evaluation of the transmission range, output speed, throttle position, transmission temperature, the brake status, brake pressure (if available), the hill counter, the hill detection flag, and the neutral idle control flag. The table of FIG. 7 lists the conditions that should be evaluated.

Referring back to FIG. 4, if all the conditions are met, control determines whether a brake pressure is available in step 220. Brake pressure can be available if the brake module is included in the vehicle to sense and determine the brake pressure. If the brake pressure is available, a hill detection flag is set to TRUE and the hill counter is incremented in step 230. In step 240, a hill brake pressure is calculated according to the following equation:

$$HillBrakePressure(n) = \frac{(HillCounter - 1) * HillBrakePressure(n-1) + BrakePressure}{HillCounter}$$

Control then loops back to step 200 where the entrance conditions are evaluated. If the brake pressure signal is not available in step 220, the hill detection flag is set to FALSE and the hill counter is incremented in step 250. Control then loops back to step 200, where the entrance conditions are evaluated.

If any of the conditions of FIG. 7 are not met, hill detection exit conditions are evaluated in step 260. Hill detection exit conditions include an evaluation of output speed, throttle position, the brake status, and brake pressure. The table of FIG. 8 lists the conditions that should be evaluated. If at least one of the conditions is met, the hill counter and the hill brake pressure are set to zero and the hill detection flag is set to FALSE in step 270. Control loops back to step 200 where the entrance conditions are evaluated. Otherwise, control loops back to step 200 where the entrance conditions are evaluated without resetting the values.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A neutral idle hill detection system for a vehicle with an automatic transmission, comprising:
a range selection input device that receives an operating range of a transmission;
a throttle position input device that receives a throttle position signal;
a transmission output speed input device that receives a transmission output speed signal;
a transmission temperature input device that receives a temperature signal;
a brake status input device that receives a brake signal; and
a control module that receives said range, said throttle position signal, said transmission output speed signal, said temperature signal, and said brake signal and that detects a hill condition based on said received signals and wherein said control module controls a first clutch of said transmission based on said hill condition.

2. The system of claim 1 further comprising a brake module that determines brake pressure, and wherein said control module receives said brake pressure and detects said hill condition based on said brake pressure.

3. The system of claim 1 wherein said control module increments a hill counter if said hill condition is detected and wherein said control module determines a neutral idle condition based on said hill counter and wherein said first clutch is controlled based on said neutral idle condition.

4. The system of claim 3, further comprising a turbine speed input device that receives a turbine speed signal and wherein said control module further determines said neutral idle condition based on said range, said transmission output speed signal, said throttle position signal, said turbine speed signal, said brake signal, and said transmission temperature signal.

5. The system of claim 4 wherein said control module further determines said neutral idle condition based on said transmission range, said transmission output speed signal, said turbine speed signal, said throttle position signal, said brake signal, said transmission temperature signal, and said hill condition.

6. The system of claim 3 further comprises:
a turbine speed input device that receives a turbine speed signal;
a brake module that determines a brake pressure, and wherein said control module further determines said neutral idle condition based on said transmission range, said transmission output speed signal, said turbine speed signal, said throttle position signal, said brake signal, said temperature signal, and said brake pressure.

7. The system of claim 5 wherein said control module detects said hill condition if said hill counter is greater than a selectable maximum and said brake pressure is greater than a hill brake pressure plus a selectable offset, wherein said hill brake pressure is calculated based on the following equation:

$$HillBrakePressure(n) = \frac{(HillCounter - 1) * HillBrakePressure(n-1) + BrakePressure}{HillCounter}.$$

8. The system of claim 1 wherein said control module detects said hill condition if said range indicates said transmission is operating in a forward range.

9. The system of claim 1 wherein said control module detects said hill condition if said output speed signal is greater than a selectable value.

10. The system of claim 1 wherein said control module detects said hill condition if said throttle position signal is less than a selectable value.

11. The system of claim 1 wherein said control module detects said hill condition if said brake signal indicates the brakes are applied.

12. The system of claim 11 wherein said control module commands a control valve to discharge fluid to and from said clutch based on whether said hill condition is detected.

13. The system of claim 1 wherein said control module detects said hill condition if said temperature signal falls within a selectable range.

14. The system of claim 1 wherein said control module increments a hill counter and sets a hill condition flag to true if control detects said hill condition.

15. The system of claim 14 wherein said control module detects said hill condition if said hill counter is less than a selectable maximum.

16. The system of claim 1 wherein said automatic transmission is a clutch to clutch transmission.

17. A method of controlling a clutch of an automatic transmission based on detecting a hill condition, comprising:
detecting a hill condition;
incrementing a counter if said hill condition is detected;
determining a neutral idle condition based on said counter; and
controlling said clutch based on said determined neutral idle condition.

18. The method of claim 17 wherein said step of detecting a hill condition comprises evaluating transmission range, transmission output speed, throttle position, a brake status, transmission temperature, a current neutral idle condition, and said counter.

19. The method of claim 17 wherein said step of detecting a hill condition comprises evaluating transmission range, transmission output speed, throttle position, a brake status, transmission temperature, a current neutral idle condition, brake pressure, and said counter.

20. The method of claim 17 wherein said step of detecting a hill condition comprises evaluating transmission range, transmission output speed, throttle position, a brake status, transmission temperature, a current hill condition, and said counter.

21. The method of claim 17 further comprising calculating a hill brake pressure if said hill condition is detected and wherein said step of controlling is based on said calculated hill brake pressure.

22. The method of claim 21 wherein said step of calculating a hill brake pressure is performed by the following equation:

$$HillBrakePressure(n) = \frac{(HillCounter - 1) * HillBrakePressure(n - 1) + BrakePressure}{HillCounter}.$$

23. The method of claim 17 further comprising setting said counter to zero if said hill condition is not detected and hill exit conditions are satisfied wherein said exit conditions include evaluating transmission output speed, throttle position, and a brake status.

24. The method of claim 23 wherein said hill exit conditions further include evaluating brake pressure.

25. The method of claim 17 wherein said step of determining a neutral idle condition is further based on a transmission range, transmission output speed, throttle position, turbine speed, a brake status, and transmission temperature.

26. The method of claim 17 wherein said step of determining a neutral idle condition is further based on a transmission range, transmission output speed, turbine speed, throttle position, a brake status, transmission temperature, and brake pressure.

27. The method of claim 17 where said step of determining a neutral idle condition is further based on a transmission range, transmission output speed, throttle position, a brake status, transmission temperature, and said hill condition.

* * * * *